(12) United States Patent
Farina

(10) Patent No.: US 9,339,862 B2
(45) Date of Patent: May 17, 2016

(54) MACHINE FOR DEFORMING THE WIRES OF GRIDS FOR MAKING ELECTRIC ACCUMULATORS

(71) Applicant: SOVEMA S.p.A., Villafranca (IT)

(72) Inventor: Pietro Farina, Villafranca (IT)

(73) Assignee: SOVEMA S.P.A., Villafranca (VR) (IT)

( * ) Notice: Subject to any disclaimer, the term of this patent is extended or adjusted under 35 U.S.C. 154(b) by 298 days.

(21) Appl. No.: 13/960,817

(22) Filed: Aug. 7, 2013

(65) Prior Publication Data

US 2015/0040361 A1 Feb. 12, 2015

(51) Int. Cl.
*B21F 33/02* (2006.01)
*H01M 4/82* (2006.01)
*B21F 5/00* (2006.01)
*B21F 33/00* (2006.01)
*H01M 4/73* (2006.01)

(52) U.S. Cl.
CPC . *B21F 33/02* (2013.01); *B21F 5/00* (2013.01); *B21F 33/00* (2013.01); *H01M 4/73* (2013.01); *Y10T 29/10* (2015.01)

(58) Field of Classification Search
CPC ............ B21F 33/00; B21F 33/02; B21F 5/00; H01M 4/73; Y10T 29/10
See application file for complete search history.

(56) References Cited

U.S. PATENT DOCUMENTS

| | | | | |
|---|---|---|---|---|
| 383,575 | A * | 5/1888 | Hunter | H01M 4/745 141/1.1 |
| 3,947,936 | A * | 4/1976 | Wheadon | B21D 31/043 29/2 |
| 4,291,443 | A * | 9/1981 | Laurie | B21D 31/046 29/6.1 |
| 2007/0193009 | A1 * | 8/2007 | Vincze | B21C 37/02 29/2 |

\* cited by examiner

*Primary Examiner* — Carlos Barcena
*Assistant Examiner* — Lilia V Nedialkova
(74) *Attorney, Agent, or Firm* — Mark M. Friedman

(57) ABSTRACT

A machine for deforming the wires of grids for making electric accumulators, which comprises two lower molds, and two upper molds which are positioned above the lower molds and which are operable to shift between a raised position, in which they are separated from the underlying lower molds, and a lowered position in which they are pressed against the lower molds to deform the wires of the grids on a grid strip. The upper molds comprise respective projecting molding areas and respective seats which are positioned between the molding areas of the relative upper mold, and each housing a corresponding piece-detacher element which, when the upper molds are in the raised position, is suitable to interfere with the grid remaining attached to the corresponding upper mold to separate the grid from such upper mold.

7 Claims, 6 Drawing Sheets

MACHINE FOR DEFORMING THE WIRES OF GRIDS FOR MAKING ELECTRIC ACCUMULATORS

TECHNICAL FIELD

The present invention relates to a machine for deforming the wires of grids for making electric accumulators, according to the preamble of the independent claim.

The machine in question is destined to be advantageously used in production processes of electric accumulators, in which starting from a continuous lead strip a continuous grid is obtained which, cut into sections of a predefined length, makes it possible to create, through subsequent steps, such as in particular coating with an active matter paste made from lead oxide, the single plates to be inserted in the electric accumulators.

In particular, the machine in question is destined for use downstream of a grid forming machine, and is suitable to shape the surface of the wires of the grids into a form facilitating the adhesion of the active matter paste subsequently spread on said grids.

PRIOR ART

Systems for making lead accumulators traditionally comprise grid forming machines, which are traditionally provided with a counter-facing punch and die between which a continuous strip of lead alloy is made to advance (by drive means). The latter is etched with a series of punches in succession so to produce in output from the forming machine a grid strip each provided with a determined mesh of wires which between them delimit a plurality of holes.

The aforesaid plants, in addition, comprise coating machines, suitable to distribute a paste of active matter (generally composed of lead oxide, diluted sulphuric acid, water and additives) on the grids so that such active matter fills the holes between the wires of said grids.

The grids have the function both of an electric conductor and of a mechanical support of the active matter needed for the electro-chemical reactions. They are destined to be inserted with the two different polarities in the box-like body of the accumulators in a bath of electrolyte solution for the realisation of the redox reactions needed to produce electricity.

The grids produced on the aforementioned forming machines of the prior art are fitted with wires having a substantially square cross-section and flat side walls orthogonal to the plane of the grid. Such shape of the wires does not guarantee good adhesion of the active matter to the grid, in that the active matter may easily shift orthogonally to the plane of the grid and thus come out of the holes of said grid, detaching itself from the latter.

In order to overcome such drawback, plants for manufacturing accumulators comprise machines for deforming the wires of the grids, such machines being suitable to shape the surface of the wires with a form facilitating the adhesion of the paste of active matter to the grids. Such machines substantially bevel the edges of the cross-section of the wires making recesses on the surfaces thereof which the active matter penetrates, thereby partially encompassing the wires and, by hardening, adhering firmly to the grid.

More specifically, the machines of the prior art for the deformation of the wires of grids traditionally comprise a support base to which a first mould provided with first shaped grooves is attached, reproducing the pattern of the weave of wires of the grids to be deformed, and are each delimited by a concave surface having a shape (for example semi circular) counter-shaped to that to be impressed on the surface of the wires.

The machine further comprises a tower attached to the support base and bearing a fitted hydraulic cylinder which in turn supports a second mould, positioned above the first mould and fitted with second shaped grooves positioned aligned above the corresponding first shaped grooves of the first mould and also delimited by concave surfaces counter-shaped to the shape to be impressed on the surface of the wires.

Operatively, the drive means of the system makes the grid strip advance between the two moulds of the machine, positioning in succession each grid above the first mould in such a way that the first shaped grooves of the first mould receive the corresponding wires of the grid inside them.

Subsequently, the linear actuator is commanded to lower the second mould until it abuts against the first mould, so as to compress the wires of the grids between the corresponding shaped grooves of the two moulds, so as to deform the surface of the wires according to the shape of the concave walls of the aforesaid shaped grooves.

The linear actuator is then commanded to lower the second mould to allow the drive means to convey the grid with the deformed wires downstream and bring the next grid from the grid strip above the first mould.

The main drawback of the machine of the prior art described above is the fact that, as a result of the friction which develops between the grid and the moulds pressed against one another, when the second mould is raised the grid tends to remain attached partially to one and partially to the other mould, especially at the central area of the grid, with the consequent formation of gutting on said grid or breaking of the wires thereon.

In order to overcome such drawback, machines are known of on the market for deforming the wires of grids which provide for pouring lubricant oil onto the moulds, so as to reduce the friction between the grid and said moulds during the pressing operations and thus facilitate the detachment of the grids when the second mould is raised.

However, even said latter machines of the prior art have been found in practice not to be without drawbacks.

A first drawback is due to the fact that part of the oil poured onto the moulds deposits on the surfaces of the grid, forming a layer of oil which would prevent good electrical contact between the wires of the grid and the active matter subsequently coated on said grid, thereby jeopardising the correct functioning of the accumulator. This entails having to subject the grids to a further cleaning operation, by treating said grids in ultrasound furnaces, with consequent high set-up costs of the system and expensive and lengthy production times of the grids.

A further drawback is the fact that to efficiently reduce the friction between the grid and the moulds large quantities of oil must be used, thereby entailing even further expenses for the production of the grids.

DESCRIPTION OF THE INVENTION

In this situation, the task of the present invention is thus to overcome the drawbacks encountered by the machines of the prior art by making available a machine for deforming the wires of grids for making electric accumulators, which makes it possible to deform the wires in a simple and economical manner, and in particular without the need to pour lubricant oil onto the moulds.

A further purpose of the present invention is to make a machine for deforming the wires of grids, which makes it possible to separate the grids from the moulds without damaging said grids.

A further purpose of the present invention is to make a machine for deforming the wires of grids, which is simple and economical to construct.

A further purpose of the present invention is to make a machine for deforming the wires of grids, which is operatively totally reliable.

These and yet other purposes are all achieved by the machine for deforming the wires of grids for making electric accumulators, which the present invention relates to according to the appended claims.

BRIEF DESCRIPTION OF THE DRAWINGS

The technical features of the invention, in accordance with the above purposes, will be apparent from the appended claims and the advantages thereof will become clear from the detailed description which follows, with reference to the accompanying drawings showing some embodiments purely by way of non-limiting examples, in which:

DETAILED DESCRIPTION OF A PREFERRED EMBODIMENT OF THE INVENTION

With reference to the accompanying drawings, a machine for deforming the wires of grids for making electric accumulators according to the present invention is globally denoted by reference number 1.

The machine 1 in question is destined to be advantageously used in a plant for the production of electric accumulators, which traditionally comprises, upstream of the machine 1 in question, a grid forming machine which starting from a solid strip of lead alloy makes a continuous grid strip, in succession, by punching. In particular, the grids made by the forming machine have a mesh of wires, which define between them a plurality of holes each having a substantially square cross-section and flat side walls orthogonal to the plane of the grid.

The system comprises, in addition, downstream of the machine 1 in question, a coating machine, suitable to distribute a paste of active matter (generally composed of lead oxide, diluted sulphuric acid, water and additives) on the grids so that such active matter fills the holes between the wires of said grids.

The machine 1 which the present invention relates to is suitable to receive in input the continuous grid strip produced by the forming machine upstream, and is suitable to deform the surface of the wires of the grids making recesses on the edges of the cross-section of the wires, which the active matter (subsequently deposited by the downstream coating machine) is susceptible to penetrate so that the active matter at least partially encompasses the wires and, by hardening, adheres firmly to the grid.

Reference will be made below in particular to several embodiment examples relative to a machine for deforming the wires of grids in lead alloy to make plates for electric accumulators, it being understood however that the material composing the grids may be any alloy suitable for use for the construction of electric accumulators.

With particular reference to the appended FIGS. 1-6, the machine 1 comprises a support structure 2 provided with at least one sliding channel 3 extending in a direction of extension X along which the aforesaid grid strip in succession is susceptible to advance. The strip is in fact made to advantageously advance along the sliding channel 3 by power supply and drive groups (not shown) positioned preferably upstream and downstream of the machine 1 and not described in detail inasmuch as of the type in themselves known to person skilled in the art.

Figure 1:
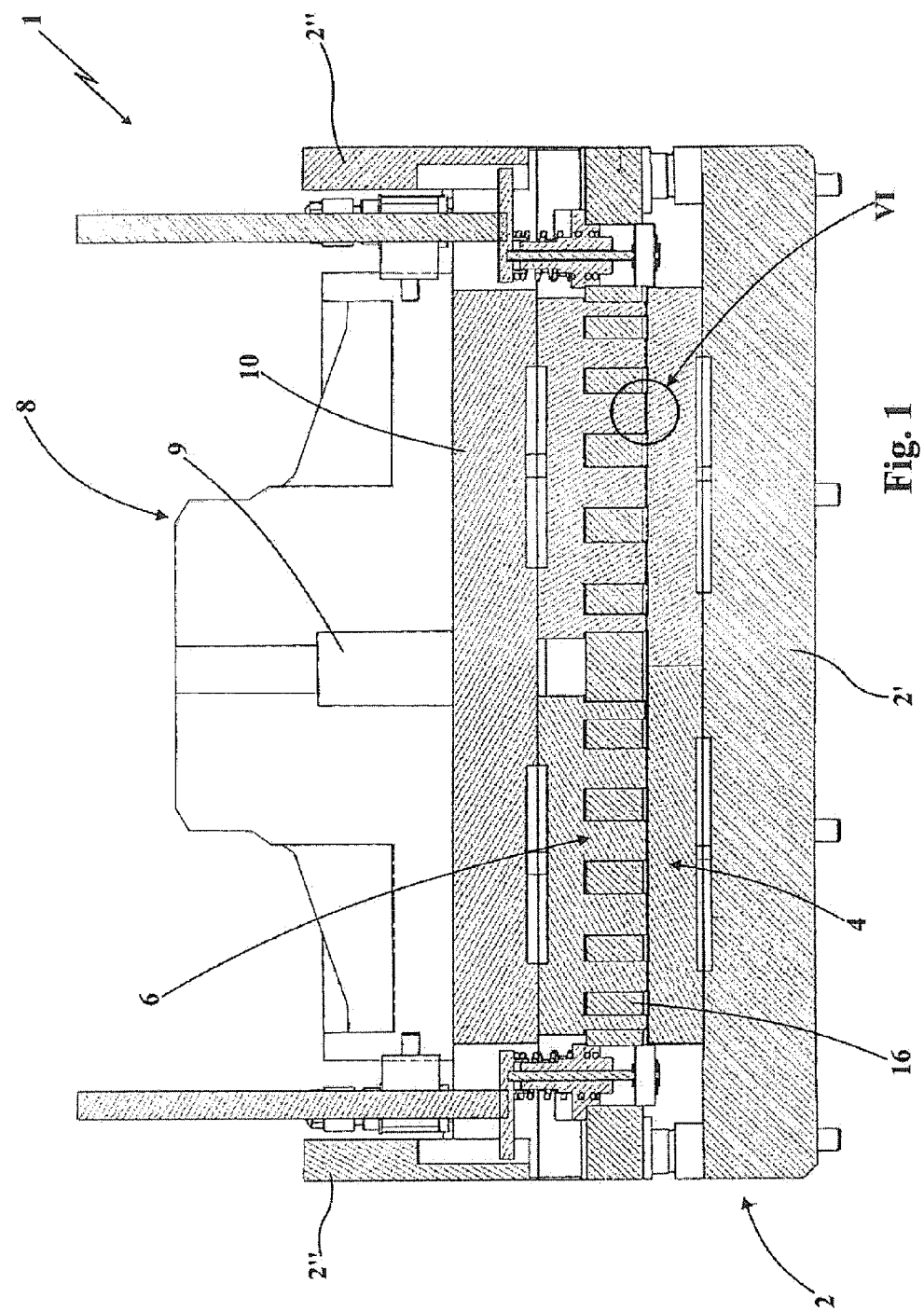
FIG. 1 is a cross-section view of the machine for deforming the wires of grids according to the present invention.
Figure 2:
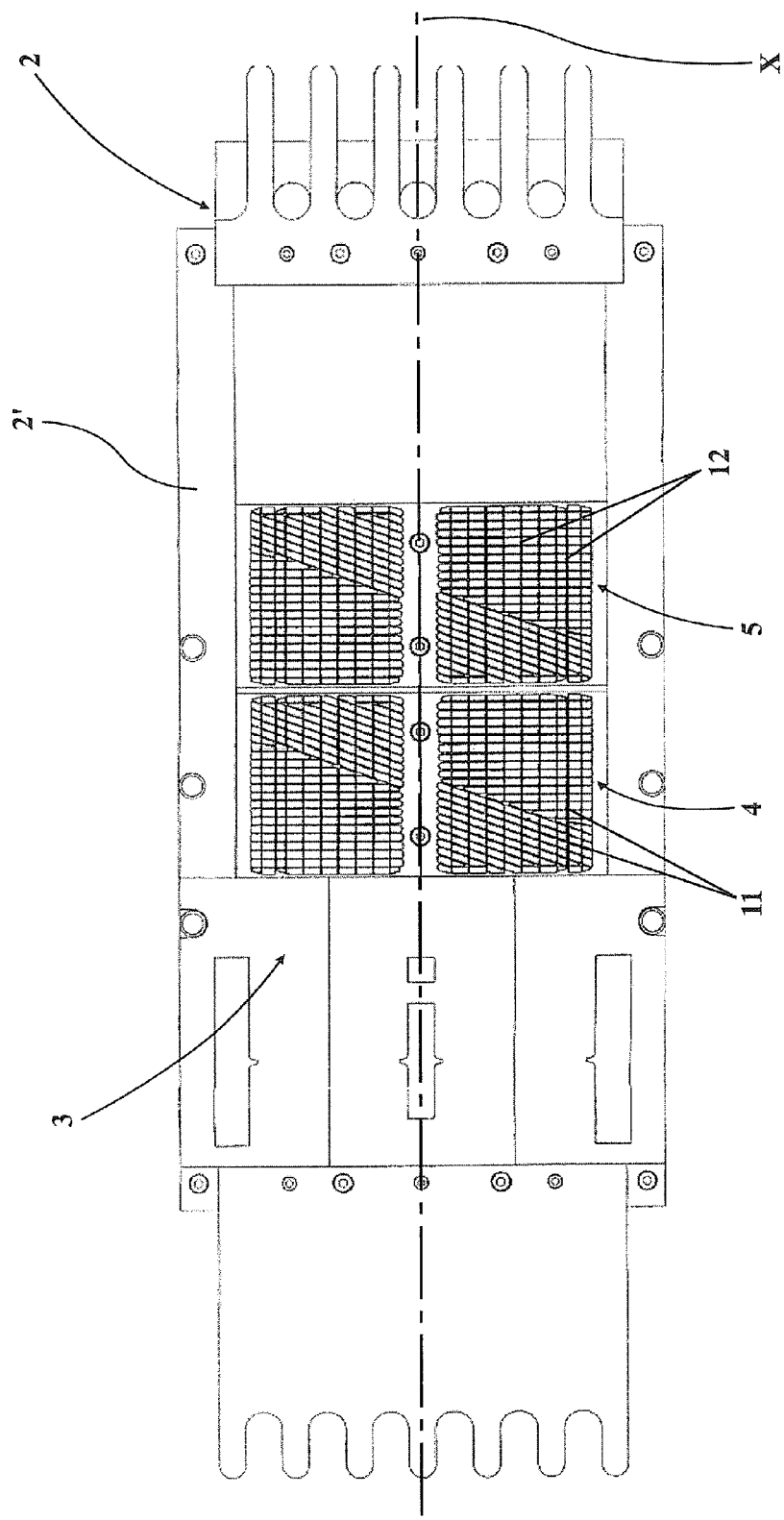
FIG. 2 is a plan view from above of a detail of the machine illustrated in FIG. 1 relative to the lower moulds, according to a first embodiment of the present invention.
Figure 3:
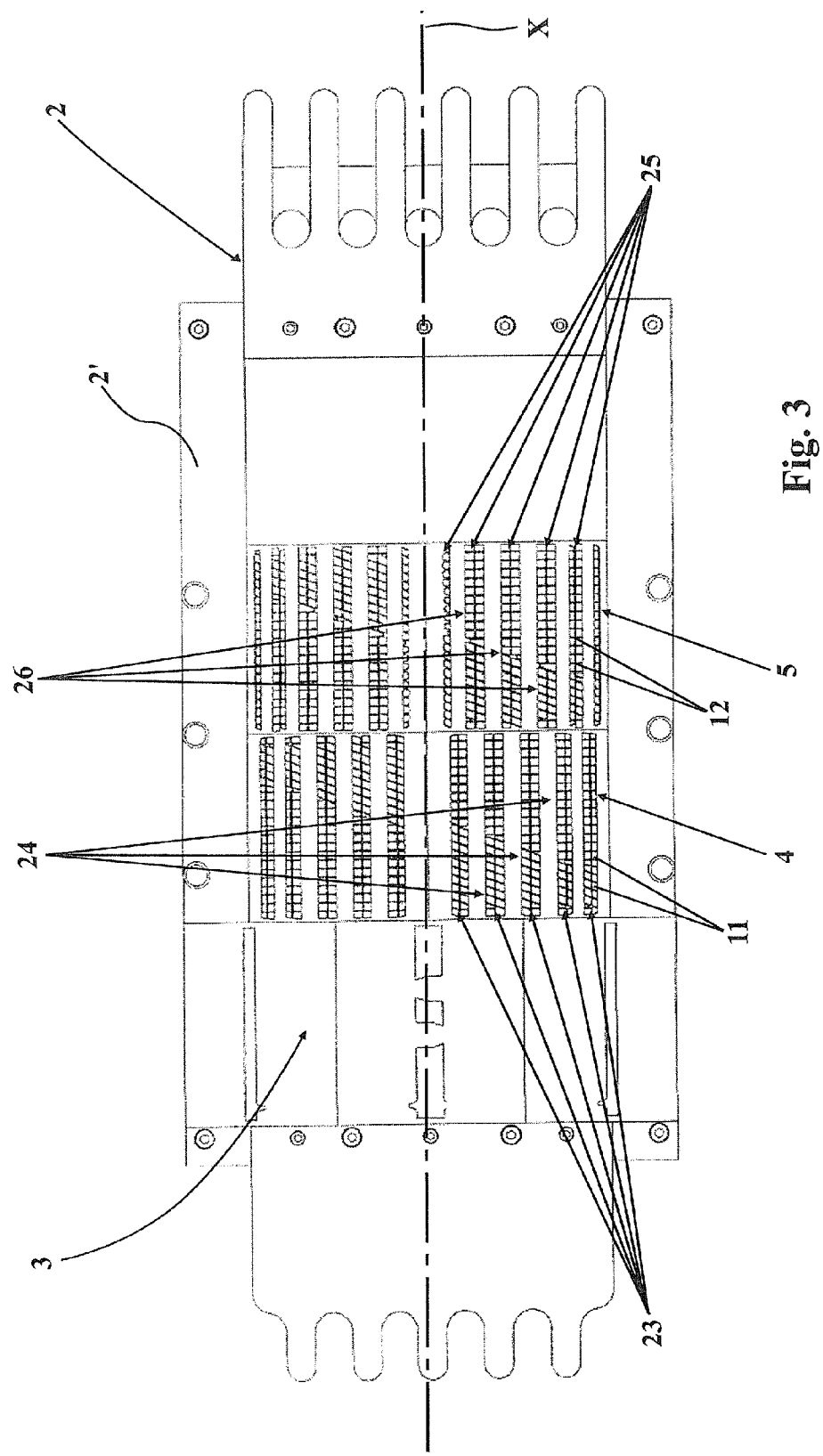
FIG. 3 is a plan view from above of a detail of the machine in question relative to the lower moulds, according to a second embodiment of the present invention.

With reference to the embodiments illustrated in FIGS. 1-3, the support structure 2 comprises a base plate 2', which in particular may be integrally attached to a supporting framework in turn resting on the ground. Diversely, the base plate 2' may be fitted in a mobile manner onto the supporting framework by means of guide means and moved by drive means with a cyclic back and forth stroke and has at least one operating section in which the support structure 2 maintains a speed substantially the same as that of the grid strip to enable the machine 1 in such section to deform the wires of the grids of the grid strip which advantageously advance at a constant speed. An example of guide means and drive means for moving the support structure is described in the patent application PD2010A000282 on page 11 lines 11-15 and on page 14 line 11-20, hereto considered appended for reference.

The machine 1 which the present invention relates to further comprises at least a first lower mould 4 and a second lower mould 5, which are attached to the support structure 2 along the sliding channel 3 aligned with each other according to the direction of extension X of said sliding channel 3, and suitable to receive in succession the grids of the aforesaid grid strip.

Moreover, the machine 1 comprises at least one first upper mould 6 and a second upper mould 7, which are respectively positioned on the support structure 2 above the first lower mould 4 and the second lower mould 5.

According to the particular embodiment illustrated in the appended figures, the machine 1 comprises a pair of each of the aforesaid moulds 4, 5, 6, 7 in which the moulds of each pair are positioned one beside the other (in an orthogonal direction to the direction of extension X) to act on a corresponding pair of adjacent grids of the grid strip.

With reference to FIG. 1, the machine 1 which the present invention relates to comprises drive means 8 connected to the first and to the second upper mould 6, 7, and suitable to shift the latter between at least one raised position in which the first and the second upper mould 6, 7 are respectively distanced from the first and the second lower mould 4, 5 to permit the passage of the grid strip, and at least one lowered position, in which the first and the second upper mould 6, 7 are respectively pressed against the first and the second lower mould 4, 5 to deform the wires of the grids of the grid strip.

More specifically, preferably, the drive means 8 are fitted on two vertical support shoulders 2" attached to the base plate 2' of the support structure 2 along opposite sides of the sliding channel 3.

Advantageously, the drive means 8 of the upper moulds 6, 7 comprise at least one linear actuator 9, which is fitted on the support structure of the machine 1 and supports the upper moulds 6, 7 facing against the respective lower moulds 4, 5.

The linear actuator 9 preferably comprises a hydraulic jack actuated by a hydraulic system (not shown) suitable to send pressurised oil to the jack to make it cyclically shift the upper moulds 6, 7, between the lowered position and the raised position.

Advantageously, according to the embodiment shown in FIG. 1, the upper moulds 6, 7 are attached to a support plate 10, which is in turn attached to the linear actuator 9, which raises and lowers it to bring the two upper moulds 6, 7 into the aforesaid raised and lowered positions.

As described in detail below, the machine 1 in question performs the deformation of the wires of the grids in several steps (for example in two steps according to the embodiment illustrated in the appended figures), in each of which a different part of the wires of each grid on the grid strip is deformed. More specifically, operatively, following the advancement of the grid strip along the sliding channel 3 of the machine 1, each grid is brought in succession between the first moulds 4, 6 which deform a first part of the wires of such grid, and is then brought between the second moulds 5, 7 which deform a second part of the wires of the grid, not deformed by the first moulds 4, 6, so as to complete the deformation of all the wires of said grid.

Obviously, without departing from the scope of the present invention, the machine 1 in question may be predisposed to perform the shaping of the wires of the grids in more than two steps, comprising a number of lower moulds and upper moulds equal to the number of steps provided for to perform the deformation of the wires.

In order to deform the wires of the grids, the moulds 4, 5, 6, 7 of the machine 1 in question have shaped grooves 11, 12, 14, 18 arranged according to the weave pattern of the wires of the grids to be deformed, and destined to receive inside them the corresponding portions of the wires to deform the surfaces thereof when each upper mould 6, 7 is lowered against the underlying lower mould 4, 5.

More specifically, with reference to FIGS. 2 and 3, the first and the second lower mould 4, 5 of the machine 1 are respectively provided with first and second shaped grooves 11, 12 delimited by corresponding first and second concave surfaces, and suitable to receive the wires to be deformed of corresponding parts of the grids of the grid strip.

Figure 4:
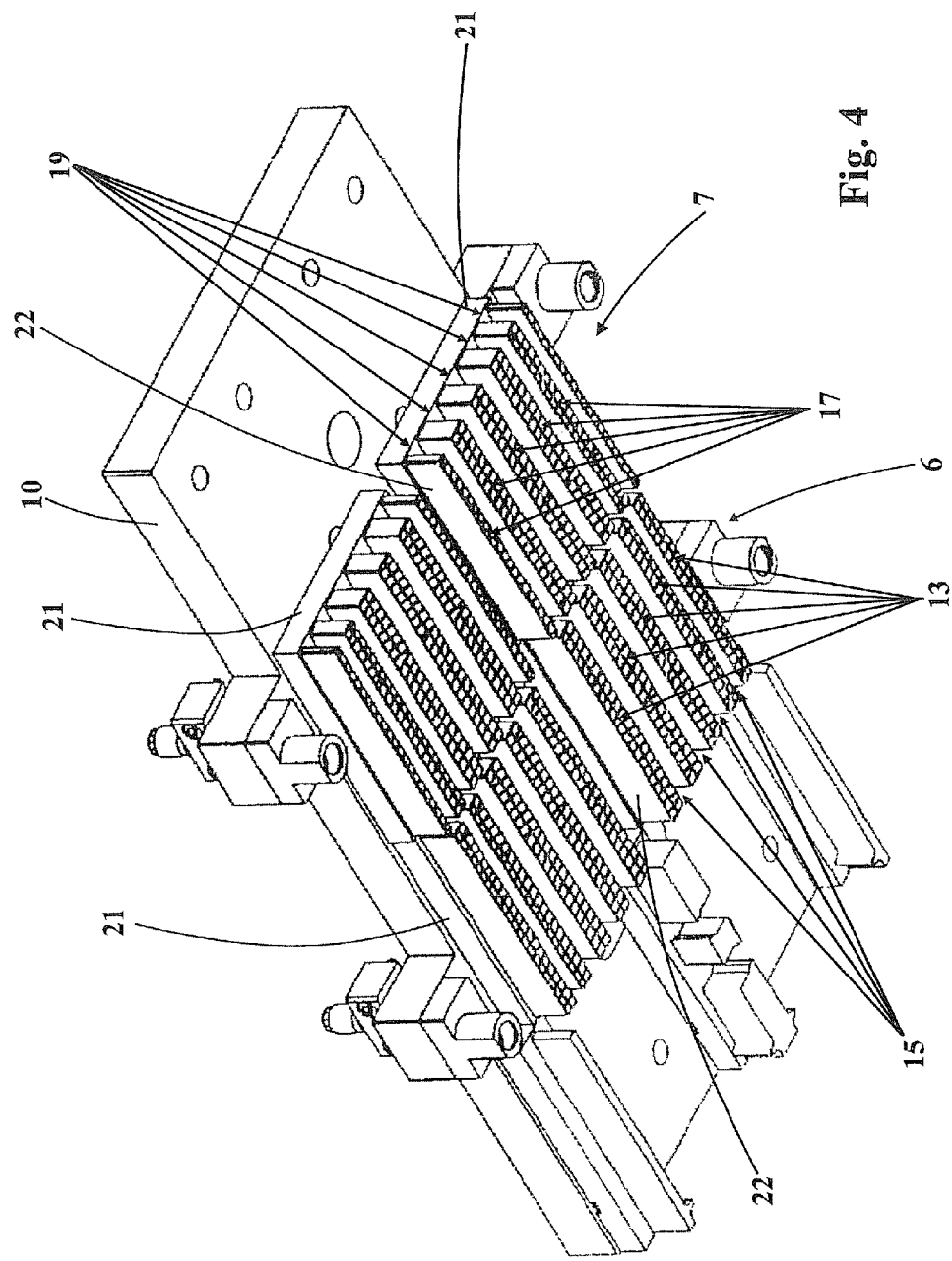
FIG. 4 is a perspective view from below of a detail of the machine illustrated in FIG. 1 relative to the upper moulds, with some parts removed so as to show others more clearly.
Figure 5:
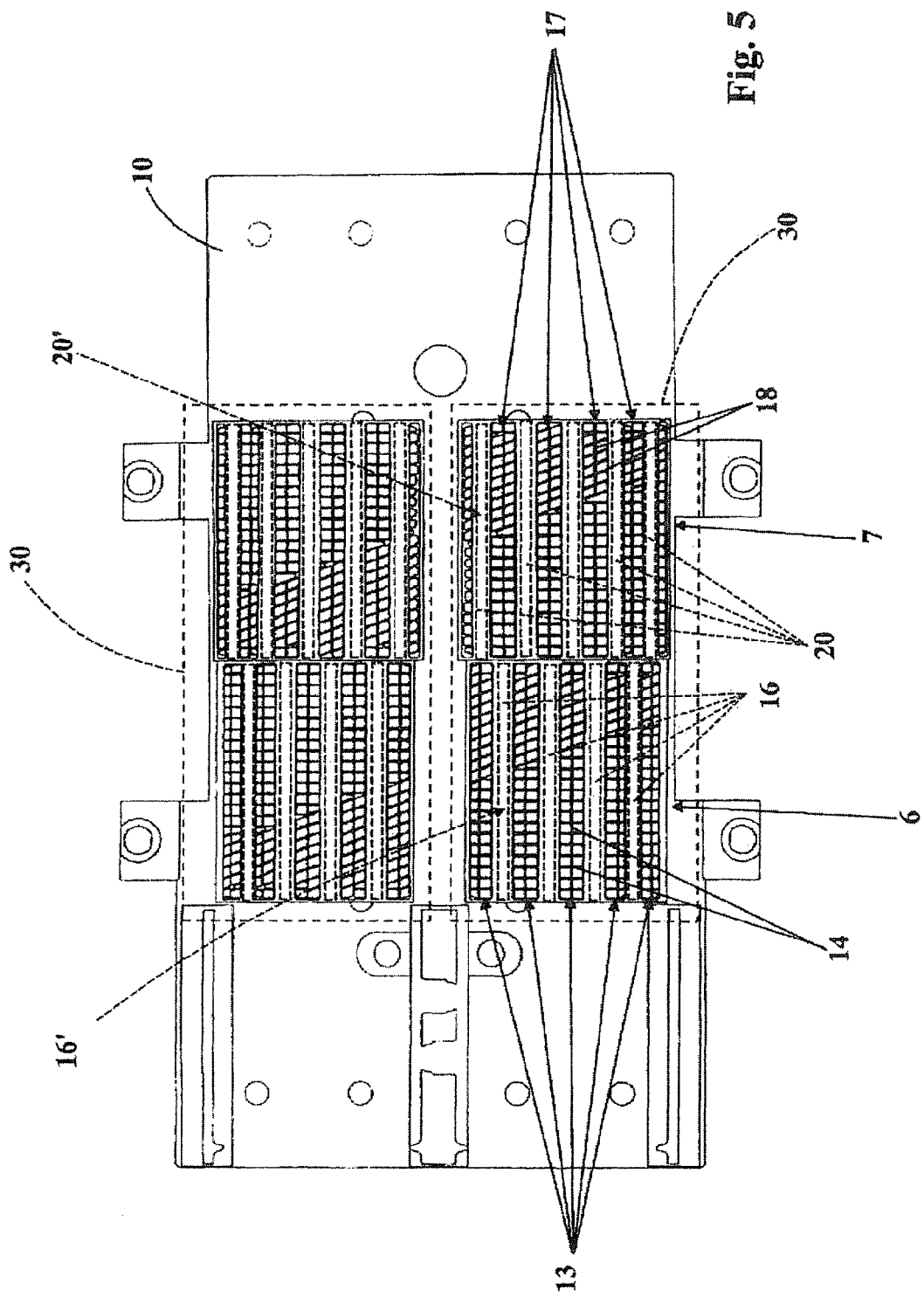
FIG. 5 is a plan view from below of the upper moulds of the machine according to the present invention illustrated in FIG. 1, in which the piece-detacher elements are shown by dotted lines.

Moreover, with reference to FIGS. 4 and 5, the first upper mould 6 comprises first projecting moulding areas 13, which are provided with third shaped grooves 14 delimited by third concave surfaces and positioned aligned above the corresponding first shaped grooves 11 of the first lower mould 4. When the first upper mould 6 is brought into the lowered position, the first moulding areas 13 of the first upper mould 6 are suitable to abut with the first lower mould 4, compressing a first part of the wires of the grid between the first concave surfaces of the first shaped grooves 11 of the first lower mould 4 and the third concave surfaces of the third shaped grooves 14 of the first upper mould 6. Thus, the concave surfaces of the shaped grooves 11, 14 deform the surface of the wires counter shaping them in relation to the shape of said concave surfaces, so as to bevel the edges of the cross section of the wires to make the aforesaid recesses which enable the firm adhesion of the active matter to the grid.

Moreover, the first upper mould 6 comprises first seats 15, which are positioned between the first moulding areas 13 and each house a first piece-detacher element 16 which, when the first upper mould 6 is in the raised position, is suitable to interfere with a second part of the wires of the grid which remains attached to the first upper mould 6, to separate the grid from said first upper mould 6.

More specifically, operatively, when the first upper mould 6 is raised, the first part of the wires, which has been deformed, remains attached by friction to the first upper mould 6 which thus raises it separating it from the first lower mould 4. When the first upper mould 6 is raised, the first piece-detacher elements 16 receive in abutment the second part of the wires (not compressed by the first moulding areas 13 of the first upper mould 6 and thus not yet deformed), detaching the grid from said first upper mould 6 following the raising thereof above the piece-detacher elements 16.

According to the present invention, the second upper mould 7 comprises second moulding areas 17, which are provided with fourth shaped grooves 18 delimited by fourth concave surfaces and positioned aligned above the corresponding second shaped grooves 12 of the second lower mould 5. When the second upper mould 7 is in the lowered position, the second moulding areas 17 are suitable to abut with the second lower mould 5 (which has received the grid coming from the first moulds 4, 6), compressing the second part of the wires of the grid between the second concave surfaces of the second shaped grooves 12 of the second lower mould 5 and the fourth concave surfaces of the fourth shaped grooves 18 of the second upper mould 7, so as to deform such second part of the grids, which had not been previously deformed by the first moulding areas 13 of the first upper mould 6.

Moreover, the second upper mould 7 comprises second seats 19, which are positioned between the aforesaid second moulding areas 17 and each house a second piece-detacher element 20, which, when the second upper mould 7 is in the raised position, is suitable to interfere with at least the first part of the wires of the grid remaining attached to the second upper mould 7, to separate the grid from said second upper mould 7.

The arrangement, according to the present invention, in each upper mould 6, 7 of several piece detacher elements 16, 20 positioned alternately to the moulding areas 13, 17 enables the piece-detacher elements 16, 20 to act on several inner areas of the grid relatively close to one another, so as to detach the grid from the corresponding upper mould 6, 7 without gutting the grid, that is without ripping the wires thereof.

Advantageously, each first and second piece-detacher element 16, 20 (respectively of the first and of the second upper mould 6, 7) is fitted with a corresponding abutment surface 16', 20' facing downwards and destined to receive in abutment respectively the first and the second part of the wires of the grid remaining attached respectively to the first and to the second upper mould 6, 7.

More specifically, preferably, when the first and the second upper moulds 6, 7 are in the lowered position, they respectively have their first and second moulding areas 13, 17 positioned at a lower height than the abutment surfaces 16', 20' respectively of the first and of the second piece-detacher element 16, 20, so that the moulding areas 13, 17 of the upper moulds 6, 7 abut against the underlying lower moulds 4, 5 without the corresponding piece detacher element 16, 20 pressing the parts of the wires of the grids not affected by the moulding areas 13, 17.

Moreover, when the first and the second upper moulds 6, 7 are in the raised position, they respectively have the first and second moulding areas 13, 17 positioned at a greater height than the abutment surfaces 16', 20' respectively of the first and of the second piece-detacher element 16, 20, so that each upper mould 6, 7 brings the grid remaining attached to it into abutment with the abutment surface 16', 20' of the corresponding piece detacher elements 16, 20 to permit the detachment of the grid from the upper moulds 6, 7.

Preferably, each first and second piece detacher element 16, 20 is integrally attached to the support structure 2 and is positioned distanced respectively from the first lower mould 4 and from the second lower mould 5 of the machine 1, to permit the passage of the continuous grid strip during its advancement along the sliding channel 3.

In particular, the piece detacher elements 16, 20 of each upper mould 6, 7 are preferably placed at a distance of approximately 1.4 mm from the corresponding lower mould 4, 5, so that the corresponding upper mould 6, 7 when raised by the underlying lower mould 4, 5, brings the grid into abutment on the piece-detacher elements 16, 20 as soon as the wires of the grid have come out of the shaped grooves 11, 12 of the lower mould 4, 5 so as to substantially immediately detach the grid from the upper mould 6, 7 to permit the grid strip to advance without jamming.

In particular, according to the embodiment shown in the appended figures, the piece detacher elements 16, 20 of each upper mould 6, 7 are made in a single body for example in the form of a metal plate 30 (shown by the dotted line in FIG. 5), which is attached to the support structure 2 of the machine 1, preferably by means of attachment screws (not shown).

Advantageously, with reference to the embodiment illustrated in FIGS. 4 and 5, the first and second moulding areas 13, 17 and the first and second seats 15, 19 respectively of the first and of the second upper mould 6, 7, extend parallel to the direction of extension X of the sliding channel 3, extending preferably along the entire length respectively of the first and of the second upper mould 6, 7 according to the aforesaid direction of extension X.

Thus, the moulding areas 13, 17 and the piece-detacher elements 16, 20 are positioned substantially in strips parallel to the direction of advancement of the continuous grid strip along the sliding channel 3, permitting the advancement of the grid strip without the risk of jamming of the wires of the grids against the moulding areas 13, 17 or against the piece-detacher elements 16, 20.

In particular, again with reference to the embodiment illustrated in FIGS. 4 and 5, each second moulding area 17 of the second upper mould 7 is aligned (according to the direction of extension X) to the corresponding piece detacher elements 16 of the first upper moulds 6 and each second piece detacher element 20 of the second upper moulds 7 is aligned with the corresponding first moulding area 13 of the first upper mould 6.

Preferably, each upper mould 6, 7 comprises a support base 21 to which several projecting portions 22 are attached underneath, each of which is provided with a corresponding aforesaid moulding area 13, 17. The projecting portions 22 of each upper mould 6, 7 are separated from each other by the seats 15, 19 in which the piece detacher elements 16, 20 of the corresponding upper mould 6, 7 are housed.

Figure 6:
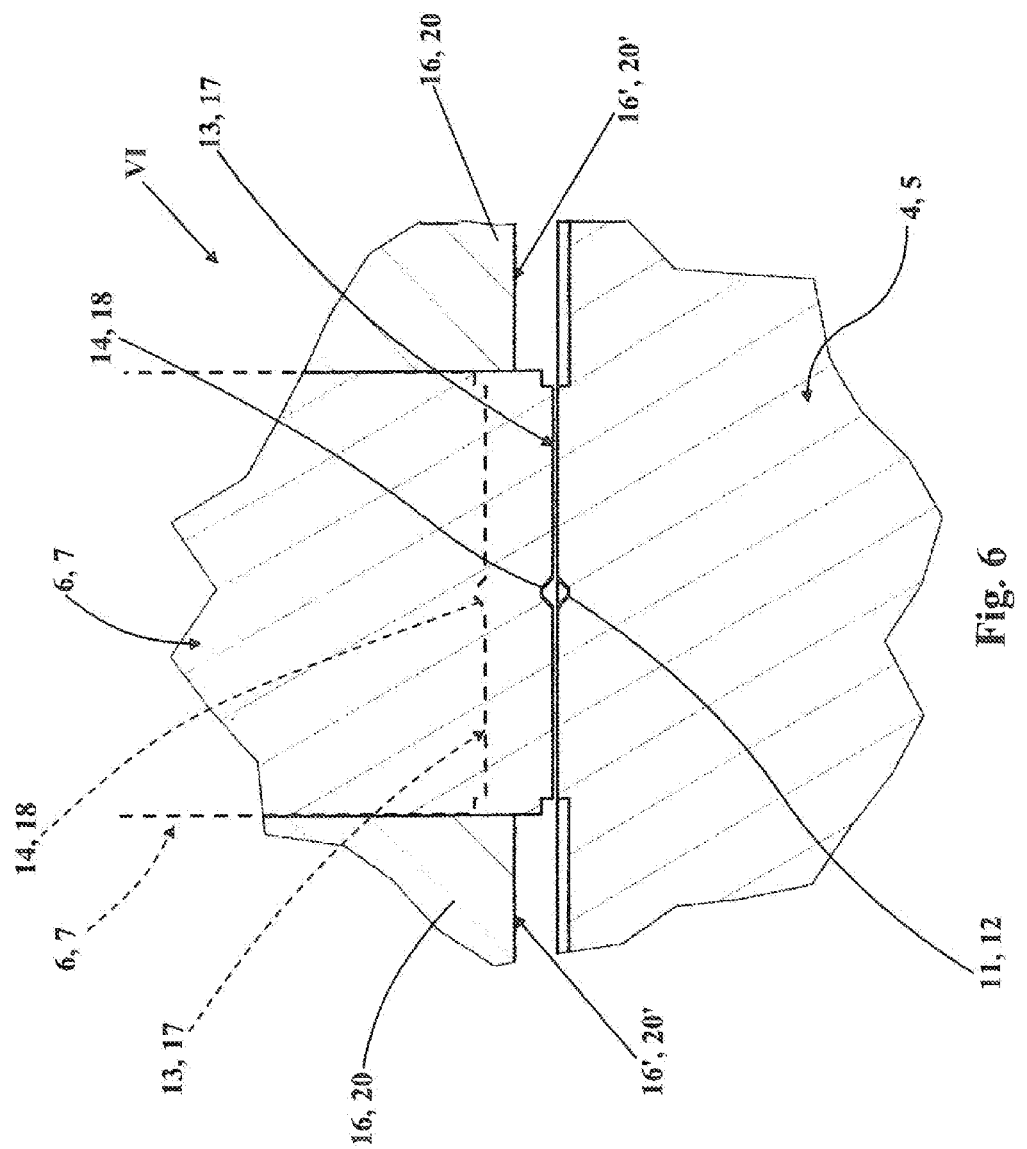
FIG. 6 shows a detail of the machine according to the present invention, indicated inside the circle VI in FIG. 1 and relative to the shaped grooves of the moulds.

Advantageously, according to the embodiment shown in FIG. 6, the shaped grooves 14, 18 of the upper moulds 6, 7 are wider than the shaped grooves 11, 12 of the lower moulds 4, 5, so that the upper moulds 6, 7 have a greater contact surface with the wires of the grids than the lower moulds 4, 5 and thereby exert a greater friction force on the wires than the lower moulds 4, 5, such greater friction force enabling each upper mould 6, 7 when brought into the raised position, to raise the grid detaching it from the underlying lower mould 4, 5 and bringing it against the piece detacher elements 16, 20 of said upper mould 6, 7.

More specifically, the third and fourth concave surfaces of the third shaped grooves 14 (of the first upper mould 6) and of the fourth shaped grooves 18 (of the second upper mould 7) are wider than the first and the second concave surfaces respectively of the first shaped grooves 11 (of the first lower mould 4) and of the second shaped grooves 12 (of the second lower mould 5).

Operatively, when each upper mould 6, 7 is lowered in abutment against the corresponding lower mould 4, 5, the wires compressed between the shaped grooves 11, 14 and 12, 18 adhere with a greater contact surface to the concave surfaces of the shaped grooves 14, 18 of the corresponding upper mould 6, 7, the contact surface of which develops a greater friction force between the grid and the upper mould 6, 7, so that the grid remains attached to the upper mould 6, 7 when the latter is raised to be brought against the piece detacher elements 16, 20 of such upper mould 6, 7.

Thus, it is ensured that after the pressing of the wires between each upper mould 6, 7 and the corresponding lower mould 4, 5, the grid remains attached to the upper mould 6, 7 when the latter is brought into the raised position, so as to bring the grid against the piece detacher elements 16, 20 of such upper mould 6, 7.

Advantageously, again with reference to the embodiment illustrated in FIG. 6, the concave surfaces of the shaped grooves 11, 12, 14, 18 of the moulds 4, 5, 6, 7 have a substantially trapezoidal shape, so as to mould, in correspondence with the edges of the cross-section of the wires, an inclined surface which delimits the corresponding recess permitting the adhesion of the active matter to the grid.

Obviously, the concave surfaces of the shaped grooves may be any shape suitable to shape the aforesaid recesses onto the surfaces of the wires of the grids, such as for example a semi-circular shape, without departing from the scope of the present invention. Advantageously, the concave surfaces of the shaped grooves 11, 12, 14, 18 of the moulds 4, 5, 6, 7 are provided with irregularities (for example achieved by milling, sanding, etc) suitable to impress a surface roughness on the wires of the grid, so as to further improve the adhesion of the active matter to said grid.

According to a first embodiment of the present invention illustrated in FIG. 2, the two lower moulds 4, 5 of the machine 1 are substantially the same as each other, with the shaped grooves 11, 12 of each lower mould 4, 5 reproducing the entire weave pattern of the wires of the grids to be deformed. According to such embodiment, each lower mould 4, 5 receives in abutment the corresponding upper mould 6, 7 in the lowered position only in correspondence with areas of the lower mould 4, 5 facing against the moulding areas 13, 17 of the corresponding upper mould 6, 7, while the remaining areas of each lower mould 4, 5 facing against the piece detacher elements 16, 20 of the corresponding upper mould 6, 7, are not subject to any compression, the piece detacher elements 16, 20 being distanced from the underlying lower mould 4, 5.

According to a second embodiment shown in FIG. 3, each lower mould 4, 5 of the machine 1 is provided with several moulding zones 23, 25, which face against the corresponding moulding areas 13, 17 of the overlying upper mould 6, 7, and are separated from each other by blank areas 24, 26 facing against the corresponding piece detacher elements 16, 20 of the overlying upper mould 6, 7, More specifically, preferably, the first lower mould 4 comprises first projecting moulding zones 23, which are provided with the aforesaid first shaped grooves 11, and several first blank areas 24 arranged alternately with the first moulding zones 23. Such first moulding zones 23 are positioned facing against corresponding first moulding areas 13 of the first upper mould 6 and are susceptible to receive the latter in abutment when the first upper mould 6 is brought into the lowered position to deform the first part of the wires of the grids.

Moreover, the second lower mould 5 is provided with second moulding zones 25, which are provided with the aforesaid second shaped grooves 12, and several second blank areas 26 arranged alternately with the second moulding zones 25. Such second moulding zones 25 are positioned facing against the corresponding second moulding areas 17 of the second upper mould 7 and are susceptible to receive the latter in abutment when the second upper mould 7 is in the lowered position to deform the second part of the wires of the grids.

Preferably, according to the aforesaid second embodiment of the present invention, the moulding zones 23, 25 of the lower moulds 4, 5 have a greater width (in an orthogonal direction to the direction of extension X) than the width of the moulding areas 13, 17 of the upper moulds 6, 7, so that when the moulding areas 13, 17 of the latter abut against the lower moulds 4, 5 they do not create any incision on the wires of the grids in correspondence with the longitudinal edges of said moulding areas 13, 17. More specifically, each first and second moulding zone 23, 25 respectively of the first and of the second lower mould 4, 5 has a greater width respectively to the width of the corresponding first moulding area 13 of the first upper mould 6 and of the corresponding second moulding area 17 of the second upper mould 7.

Operatively, the functioning of the machine 1 which the present invention relates to provides that the grid strip (coming from the grid forming machine upstream) is made to advance (by means of the aforesaid drive means) along the sliding channel 3 of the support structure 2 bringing in succession each grid above the first lower mould 4, the first shaped grooves 11 of which receive inside them the corresponding portions of wires of the grid.

Subsequently, the first upper mould 6 is driven by the drive means 8 to move from the raised position to the lowered position, in which the first moulding areas 13 abut against the first lower mould 4 compressing the first part of the wires between the first shaped grooves 11 of the first lower mould 4 and the third shaped grooves 14 of the first upper mould 6, so that the concave surfaces of such shaped grooves 11, 14 deform the surface of the wires compressed therein shaping the cross section of the wires with the aforesaid recesses which facilitate the firm adhesion of the active matter to the grid.

Subsequently, the first upper mould 6 is brought by the drive means 8 into the raised position, in which it raises the grid from the first lower mould 4 to bring it against the first piece detacher elements 16, which receive in abutment the second part of the wires (not compressed by the first moulding areas 13) and, following the further raising of the first upper mould 6, detach the grid therefrom.

Then, following the advancement of the grid strip along the sliding channel 3, the grid is brought above the second lower mould 5 (the second shaped grooves 12 of which receive inside them the corresponding portions of wires of the grid) and simultaneously a subsequent grid of the grid strip is brought above the first lower mould 4.

Subsequently, the second upper mould 7 is driven by the drive means 8 to move from the raised position to the lowered position, in which its second moulding areas 17 abut against the second lower mould 5 compressing the second part of the wires (which were not deformed by the first moulds 4, 6) between the second shaped grooves 12 of the second lower mould 5 and the fourth shaped grooves 18 of the second upper mould 7, so that the concave surfaces of such shaped grooves 12, 18 deform the surface of the wires compressed therein shaping the cross section of the wires with the recesses to facilitate the adhesion of the active matter to the grid.

Subsequently, the second upper mould 7 is brought by the drive means 8 into the raised position, in which it raises the grid from the second lower mould 5 to bring it against the second piece detacher elements 20, which receive in abutment the first part of the wires (previously deformed by the first moulds 4, 6) and, following the further raising of the second upper mould 7, detach the grid therefrom.

Advantageously, during the lowering and raising of the second upper mould 7 the drive means 8 simultaneously actuate the lowering and raising of the first upper mould 6 to deform the first part of the wires of the subsequent grid on the grid strip.

Then, the grid is conveyed downstream of the machine 1, for example to the active matter coating machine, and simultaneously the subsequent grid, the first part of the wires of which has been deformed by the first moulds 4, 6, is brought above the second lower mould 5 to complete the deformation of the wires as described above on the grid preceding it in the grid strip.

The invention thus conceived achieves the relative objectives.

The invention claimed is:

1. A machine for deforming the wires of grids to make electric accumulators, comprising:
    a support structure (2) provided with at least one sliding channel (3) extending in a direction of extension (X) along which a grid strip of grids in succession is susceptible to advance;
    at least a first lower mould (4) and at least a second lower mould (5), which are attached to said support structure (2) in said sliding channel (3) aligned with each other in said direction of extension (X), and are suitable to receive in succession the grids of said grid strip;
    at least a first upper mould (6) and at least a second upper mould (7), which are fitted on said support structure (2) respectively above said first lower mould (4) and said second lower mould (5);
    drive means (8) connected to said first and second upper mould (6, 7), and suitable to shift said first and second upper mould (6, 7) between at least one raised position in which said first and second upper mould (6, 7) are respectively distanced from said first and the second lower mould (4, 5) to permit the passage of said grid strip, and at least one lowered position, in which said first and second upper mould (6, 7) are respectively pressed against said first lower mould and second lower mould (4, 5) to deform the wires of the grids of said grid strip;
    said first lower mould (4) and said second lower mould (5) being respectively provided with first and second shaped grooves (11, 12) delimited by corresponding first and second concave surfaces, and suitable to receive the wires of corresponding parts of the grids of said grid strip
    said first upper mould (6) comprising:
        first projecting moulding areas (13), which are provided with third shaped grooves (14) delimited by third concave surfaces and positioned aligned above corresponding first shaped grooves (11) of said first lower mould (4), and the first projecting moulding areas (13) of which, with said first upper mould (6) in said lowered position, are suitable to abut on said first lower mould (4) compressing a first part of the wires of said grids between the first and third concave surfaces respectively of said first (11) and of said third (14) shaped grooves;

first seats (15), which are positioned between said first projecting moulding areas (13) and each house a first piece-detacher element (16) which, with said first upper mould (6) in said raised position, is suitable to interfere with a second part of the wires of said grids remaining attached to said first upper mould (6), to separate said grids from said first upper mould (6);

said second upper mould (7) comprising:

second moulding areas (17), which are provided with fourth shaped grooves (18) delimited by fourth concave surfaces and positioned aligned above corresponding second shaped grooves (12) of said second lower mould (5), and the second moulding areas (17) of which, with said second upper mould (7) in said lowered position, are suitable to abut on said second lower mould (5) compressing said second part of the wires of said grids between the second and the fourth concave surfaces respectively of said second (12) and of said fourth (18) shaped grooves;

second seats (19), which are positioned between said second moulding areas (17) and each house at least a second piece-detacher element (20) which, with said second upper mould (7) in said raised position, is suitable to interfere with at least said first part of the wires of said grids remaining attached to said second upper mould (7), to separate said grids from said second upper mould (7).

2. The machine as claimed in claim 1, characterised in that each said first and second piece-detacher element (16, 20) is provided with an abutment surface (16', 20') facing downwards and destined to receive in abutment corresponding parts of the wires of said grids remaining attached respectively to said first and to said second upper mould (6, 7);

said first and second upper mould (6, 7) in said lowered position, respectively having said first and second moulding areas (13, 17), positioned at a lower height than the abutment surfaces (16', 20') respectively of said first and said second piece-detacher element (16, 20);

said first and second upper mould (6, 7) in said raised position, respectively having said first and second moulding areas (13, 17), positioned at a greater height than the abutment surfaces (16', 20') respectively of said first and said second piece-detacher element (16, 20), to bring said grids into abutment on said abutment surface (16', 20').

3. The machine as claimed in claim 1, characterised in that each said first and second piece-detacher element (16, 20) is integrally attached to said support structure (2) respectively distanced from said first and from said second lower mould (4, 5).

4. The machine as claimed in claim 1, characterised in that:

said first and second moulding areas (13, 17) and said first and second seats (15, 19) extend parallel to said direction of extension (X).

5. The machine as claimed in claim 4, characterised in that each second moulding area (17) of said second upper mould (7) is aligned with a corresponding said first piece-detacher element (16) of said first upper mould (6), and each second piece-detacher element (20) of said second upper mould (7) is aligned with a corresponding said first moulding area (13) of said first upper mould (6).

6. The machine as claimed in claim 1, characterised in that the third concave surfaces of the third shaped grooves (14) of said first upper mould (6) and the fourth concave surfaces of the fourth shaped grooves (18) of said second upper mould (7) are respectively wider than the first concave surfaces of the first shaped grooves (11) of said first lower mould (4) and than the second concave surfaces of the second shaped grooves (12) of said second lower mould (5).

7. The machine as claimed in claim 1, characterised in that said first lower mould (4) comprises several first projecting moulding zones (23), which are provided with said first shaped grooves (11), and several first blank areas (24) arranged alternately with said first projecting moulding zones (23); said first projecting moulding zones (23) are positioned facing against corresponding said first moulding areas (13) of said first upper mould (6) and being susceptible to receive in abutment said first moulding areas (13) with said first upper mould (6) in said lowered position;

the second lower mould (5) comprising second moulding zones (25), which are provided with said second shaped grooves (12), and several second blank areas (26) arranged alternately with said second moulding zones (25); said second moulding zones (25) being positioned facing against corresponding said second moulding areas (17) of said second upper mould (7) and being susceptible to receive in abutment said second moulding areas (17) with said second upper mould (7) in said lowered position.

* * * * *